(12) United States Patent
Lyon et al.

(10) Patent No.: US 7,728,823 B2
(45) Date of Patent: Jun. 1, 2010

(54) SYSTEM AND METHOD FOR PROCESSING RAW DATA OF TRACK PAD DEVICE

(75) Inventors: Benjamin Lyon, San Jose, CA (US); Stephanie Cinereski, Sunnyvale, CA (US); Chad Bronstein, San Francisco, CA (US); Steven Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 979 days.

(21) Appl. No.: 11/232,299

(22) Filed: Sep. 21, 2005

(65) Prior Publication Data
US 2006/0066588 A1 Mar. 30, 2006

Related U.S. Application Data

(63) Continuation-in-part of application No. 10/949,060, filed on Sep. 24, 2004.

(51) Int. Cl.
*G06F 3/041* (2006.01)
(52) U.S. Cl. ............... 345/173; 345/174; 345/176; 178/18.01; 178/18.03
(58) Field of Classification Search ............ 345/145, 345/156–160, 169, 173, 174, 177–179, 358, 345/701, 702, 856, 419, 115, 133, 334, 349, 345/249, 355; 178/18, 18.01–18.03, 18.05–18.07, 178/19, 19.01, 19.03; 341/23, 33; 382/119, 382/181, 186, 187, 189; 463/30, 36–38; 434/45
See application file for complete search history.

(56) References Cited

U.S. PATENT DOCUMENTS

| | | | |
|---|---|---|---|
| 3,541,541 A | 11/1970 | Engelbart | |
| 4,550,221 A | 10/1985 | Mabusth | |
| 5,543,588 A * | 8/1996 | Bisset et al. | 178/18.06 |

(Continued)

FOREIGN PATENT DOCUMENTS

CN 87 1 04380 B 8/1988

(Continued)

OTHER PUBLICATIONS

Texas Instruments, TSC-2003 I2C Touch Screen Controller, Data Sheet SBAS162, Oct. 2001, P. O. Box 655303, Dallas Texas75265.

(Continued)

*Primary Examiner*—Amare Mengistu
*Assistant Examiner*—Dmitriy Bolotin
(74) *Attorney, Agent, or Firm*—Morrison & Foerster LLP (57) ABSTRACT

An input device and system are described that acquires (measures) raw track pad sensor data and transmits this data to a host computer where it is analyzed by an application executing on one or more host computer central processing units. The resulting input processing architecture provides a track pad input device that is both lower in cost to manufacture and more flexible than prior art track pad input devices. Lower costs may be realized by eliminating the prior art's dedicated track pad hardware for processing sensor data (e.g., a processor and associated firmware memory). Increased flexibility may be realized by providing feature set functionality via software that executes on the host computer. In this architecture, track pad functionality may be modified, updated, and enhanced through software upgrade procedures.

35 Claims, 5 Drawing Sheets

U.S. PATENT DOCUMENTS

| | | | |
|---|---|---|---|
| 5,675,362 | A | 10/1997 | Clough et al. |
| 5,825,351 | A | 10/1998 | Tam |
| 5,825,352 | A | 10/1998 | Bisset et al. |
| 5,940,065 | A | 8/1999 | Babb et al. |
| 6,323,846 | B1 | 11/2001 | Westerman et al. |
| 6,369,837 | B1 * | 4/2002 | Schirmer .................... 715/764 |
| 6,414,671 | B1 * | 7/2002 | Gillespie et al. ............ 345/157 |
| 6,570,557 | B1 | 5/2003 | Westerman et al. |
| 6,677,932 | B1 | 1/2004 | Westerman |
| 7,030,861 | B1 * | 4/2006 | Westerman et al. ......... 345/173 |
| 7,133,031 | B2 * | 11/2006 | Wang et al. ................. 345/173 |
| 7,199,790 | B2 | 4/2007 | Rosenberg et al. |
| 2003/0098858 | A1 | 5/2003 | Perski et al. |
| 2003/0221877 | A1 | 12/2003 | Harrison |
| 2006/0066582 | A1 | 3/2006 | Lyon et al. |

FOREIGN PATENT DOCUMENTS

| | | | |
|---|---|---|---|
| DE | 102 51 296 A1 | 5/2004 | |
| WO | 97/18547 A1 | 5/1997 | |
| WO | WO 97/18547 | 5/1997 | |
| WO | 99/38149 A1 | 7/1999 | |
| WO | WO-2006/036607 A1 | 4/2006 | |
| WO | WO-2007/037806 A1 | 4/2007 | |

OTHER PUBLICATIONS

"iGesture Pad—The Multi-Finger USB TouchPad with Whole-Hand Gestures," obtained from http://www.fingerworks.com/igesture.html on Aug. 27, 2004, generated Aug. 27, 2004, 2-pgs.

"FingerWorks—iGesture—Technical Details,"obtained from http://www.fingerworks.com/igesture_tech.html, generated Aug. 27, 2004, 1-pg.

"FingerWorks—iGesture—User's Guide," obtained from http://www.fingerworks.com/igesture_userguide.html, generated Aug. 27, 2004, 1-pg.

FingerWorks—Guide to Hand Gestures for USB Touchpads, obtained from http://www.fingerworks.com/igesture_userguide.html, generated Aug. 27, 2004, 1-pg.

FingerWorks—Mouse Emulation—Gesture Guide, obtained from http://www.fingerworks.com/gesture_guide_mouse.html, generated Aug. 27, 2004, 1-pg.

FingerWorks—Gesture Guide—Editing, obtained from http://www.fingerworks.com/gesture_guide_editing.html, generated on Aug. 27, 2004, 1-pg.

FingerWorks—Gesture Guide—Text Manipulation, obtained from http://www.fingerworks.com/gesture_guide_text_manip.html, generated on Aug. 27, 2004, 2-pgs.

FingerWorks—Gesture Guide—File Operations, obtained from http://www.fingerworks.com/gesture_guide_files.html, generated on Aug. 27, 2004, 1-pg.

FingerWorks—Gesture Guide—Application Switching, obtained from http://www.fingerworks.com/gesture_guide_apps.html, generated on Aug. 27, 2004, 1-pg.

FingerWorks—Gesture Guide—Web, obtained from http://www.fingerworks.com/gesture_guide_web.html, generated on Aug. 27, 2004, 1-pg.

"FingerWorks—Gesture Guide—Tips and Tricks," obtained from http://www.fingerworks.com/gesture_guide_tips.html, generated Aug. 27, 2004, 2-pgs.

"FingerWorks—The Only Touchpads with Ergonomic Full-Hand Resting and Relaxation!," obtained from http://www.fingerworks.com/resting.html, Copyright 2001, 1-pg.

"FingerWorks—Tips for Typing on the Mini," obtained from http://www.fingerworks.com/mini_typing.html, generated on Aug. 27, 2004, 2-pgs.

PCT International Search Report and Written Opinion received in corresponding application No. PCT/US2006/031524 dated Nov. 29, 2006.

Anonymous; "FingerWorks—Gesture Guide—Mouse Emulation;" Internet Article [Online] Dec. 10, 2002; XP002404586; Retrieved at URL: http://web.archive.org/web/20021210155752/ http://www.fingerworks.com/gesture_guide_mouse.html.

Anonymous; "FingerWorks—Gesture Guide—Editing;" Internet Article [Online] 13 Feb. 13, 2004; XP002404587; Retrieved at URL:http://web.archive.org/web/20040213220556/www.fingerworkds.com/gesture_guide_editing.html.

Anonymous; "FingerWorks—Gesture Guide—Text Manipulation;" Internet Article [Online] Jun. 6, 2004; XP002404588; Retrieved at URL:http://ww.archive.org/web/20040606073731/www.fingerworks.com/gesture_guide_text_manip.html.

Anonymous; "FingerWorks—Gesture Guide—File Operations;" Internet Article [Online] Jun. 18, 2004; XP002404589; Retrieved at URL:http://web.archive.org/web/20040618040236/www.fingerworks.com/gesture_guide_files.html.

Anonymous; "FingerWorks—Gesture Guide—Application Operations;" Internet Article [Online] Dec. 3, 2002; XP002404590; Retrieved at URL:http://web.archive.org/web/20021203165232/http://www.fingerworks.com/gesture_guide_apps.html.

Anonymous; "FingerWorks—Gesture Guide—Web;" Internet Article [Online] Jun. 5, 2004; XP002404591; Retrieved at URL:http://web.archive.org/web/20040605091621/www.fingerworks.com/gesture_guide_web.html.

Anonymous; FingerWorks—Tips for typing; Internet Article [Online] Jun. 5, 2004; XP002404592; Retrieved at URL: http://web.archive.org/web/20040605171237/www.fingerworks.com/mini-typing.html.

Westerman, et al.; "Multi-Touch: A New Tactile 2-D Gesture Interface for Human-Computer Interaction;" Proceedings of the Human Factors and Ergonomics Society 45th Annual Meeting; Oct. 2001; pp. 632-636; XO008070547.

International Search report dated Mar. 3, 2006 (PCT/US 05/03325; 119-0052WO).

Chinese Office Action mailed Apr. 4, 2008, for Chinese Patent Application No. 200580032179.8, filed Sep. 15, 2005, 12 pages. (English translation).

European Office Action mailed Feb. 4, 2008, for EP Application No. 05796332.4, filed Sep. 15, 2005, seven pages.

Final Office Action mailed Sep. 18, 2008, for U.S. Appl. No. 10/949,060, filed Sep. 24, 2004, eight pages.

Korean Office Action mailed Sep. 9, 2008, for KR Application No. 10-2007-7009191, filed Sep. 15, 2005, five pages. (English translation).

Non-Final Office Action mailed Aug. 7, 2007, for U.S. Appl. No. 10/949,060, filed Sep. 24, 2004, ten pages.

Non-Final Office Action mailed Feb. 5, 2008, for U.S. Appl. No. 10/949,060, filed Sep. 24, 2004, eight pages.

Non-Final Office Action mailed Mar. 9, 2009, for U.S. Appl. No. 10/949,060, filed Sep. 24, 2004, eight pages.

Final Office Action mailed Sep. 8, 2009, for U.S. Appl. No. 10/949,060, filed Sep. 24, 2004, eight pages.

* cited by examiner

SYSTEM AND METHOD FOR PROCESSING RAW DATA OF TRACK PAD DEVICE

CROSS-REFERENCE TO RELATED APPLICATIONS

This application is a continuation-in-part of co-pending U.S. patent application Ser. No. 10/949,060 filed Sep. 24, 2004, which is incorporated herein by reference in its entirety and to which priority is claimed.

BACKGROUND

The invention relates generally to computer input devices and more particularly to a track pad input device that generates and transmits measured (raw) sensor data to a host computer system. Software executing on the host computer system analyzes the raw sensor data to determine the user's action.

A track pad is a touch-sensing planar digitizer input device used instead of, or in conjunction with, a mouse or trackball. During use, an operator places a finger on the track pad and moves the finger along the touch-sensing planar surface. The track pad detects the movement of the finger and in response provides location and/or motion signals to a computer. There are two common types of track pad sensor devices: resistive and capacitive. A resistive track pad sensor is a mechanical sensor that uses two layers of material that are typically separated by air. Pressure from a finger pushes the top layer (generally a thin, clear polyester film) so that it touches the bottom layer (generally glass). The voltage at the contact point is measured and the finger's location and/or motion is computed and transmitted to a host computer system. After the finger is removed, the top layer "bounces back" to its original configuration. A capacitive track or touch pad sensor, in contrast, is a solid-state sensor made using printed circuit board ("PCB") or flex circuit technology. A finger on, or in close proximity to, a top grid of conductive traces changes the capacitive coupling between adjacent traces or the self-capacitance of each trace. This change in capacitance is measured and the finger's location and/or motion is computed and transmitted to a host computer system.

Figure 1:
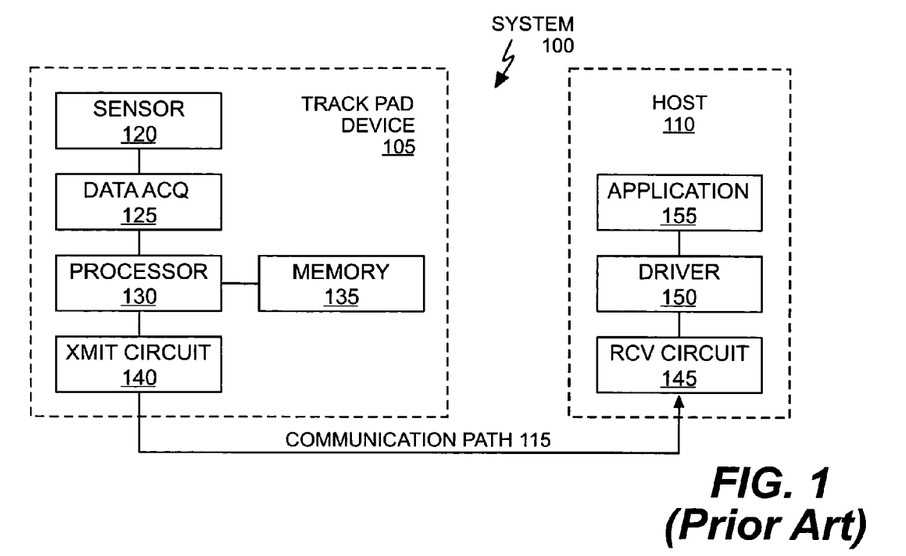
FIG. 1 shows, in block diagram form, a track pad-computer system architecture in accordance with the prior art.

Referring to FIG. 1, prior art computer system 100 includes track pad device 105 coupled to host computer module 110 via communication path 115. Track pad device 105 comprises sensor 120, data acquisition circuit 125, processor 130, memory 135 and transmit circuit 140. In the case of a capacitive track pad device, as a user's finger(s) is (are) moved over the surface of sensor 120, data acquisition circuit 125 measures changes in the capacitive coupling between adjacent sensor elements (or the self-capacitance of a given sensor element). Processor 130, in conjunction with memory 135, processes the acquired capacitance signals to compute a signal indicating the user's finger position on sensor 120 (e.g., a $\Delta x$ and $\Delta y$ signal). In some prior art track pad devices, processor 130 may also determine if multiple fingers are activating sensor 120 and whether certain predetermined finger motions (often referred to as "gestures") are being made—e.g., "select," "drag," "file open" and "file close" operations. At specified intervals (e.g., 50 times per second), the user's finger location and/or motion as determined by processor 130 is transmitted to host computer module 110 via communication path 115. At host computer module 110, receive circuit 145 receives the transmitted track pad signal and passes its information to driver application 150. Driver application 150, in turn, makes the computed sensor information available to other applications such as, for example, window display subsystem application 155. Thus, prior art system 100 utilizes a dedicated processor for measuring and analyzing raw track pad sensor data to generate a signal that indicates a user's action.

One of ordinary skill in the art will recognize that processor 130 may be embodied in a general-purpose processor (e.g., a microprocessor), a microcontroller, or a special purpose or custom designed processor or state machine (e.g., an application specific integrated circuit or a custom designed gate array device). Further, memory 135 is typically used to provide permanent storage for instructions (i.e., firmware) to drive processor 130 and may, optionally, include random access memory and/or register storage. A benefit of the architecture of FIG. 1 is that host computer module 110 does not need to know about or understand the type of data generated by sensor 120. A corollary of this feature is that host computer module 110 does not process track pad sensor data.

It will also be recognized by one of ordinary skill that a drawback to the architecture of FIG. 1 is that the feature set (i.e., what motions are detectable) provided by track pad device 105 is essentially fixed by its dedicated hardware—processor 130 and associated firmware (memory 135). Another drawback to the architecture of FIG. 1 is that each manufactured device 105 includes the cost of processor 130 and associated firmware memory 135. Thus, it would be beneficial to provide a track pad device that overcomes these inherent drawbacks.

SUMMARY

In one embodiment the invention provides a track pad input device that includes a track pad sensor element that generates output signals representing a track pad sensor characteristic (i.e., capacitance or resistance), a data acquisition circuit that measures a (digital) value encoding the track pad sensor's characteristic and a communication circuit that transmits the measured track pad sensor values to a general purpose processor for analysis, the general purpose processor is also responsible for executing user and other system level tasks or applications. In one specific embodiment, the track pad sensor is a capacitive track pad sensor so that measured values comprise raw track pad sensor values and the general-purpose processor corresponds to a host computer system's central processing unit.

DETAILED DESCRIPTION

Figure 2:
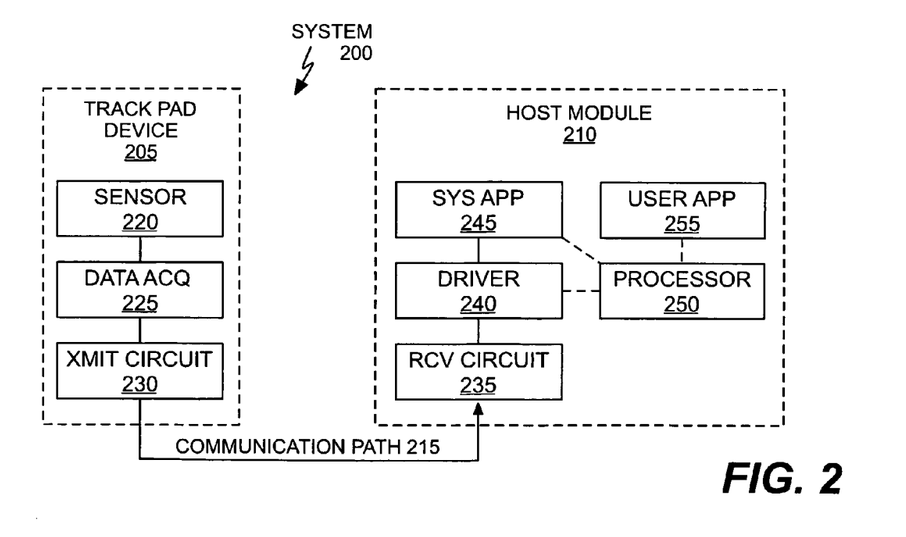
FIG. 2 shows, in block diagram form, a track pad-computer system architecture in accordance with one embodiment of the invention.

Referring first to FIG. 2, the general architecture of a system incorporating a track pad device in accordance with the invention is illustrated. As shown, system 200 includes track pad device 205 coupled to host module 210 through communication path 215. Track pad device 205 comprises track pad sensor 220 that generates signals based on user manipulation thereof, data acquisition circuit 225 for capturing or measuring the sensors and transmit circuit 230 for aggregating and periodically transmitting the measured sensor data values to host module 210 via communication path 215. At host module 210, receive circuit 235 receives the measured sensor data and passes them to driver application 240. Driver application 240, in turn, processes or analyzes the measured data to determine the user's conduct (e.g., a "single click," "double click," "scroll" or "drag" operation), passing the calculated location and/or movement information to other applications such as, for example, window display subsystem application 245. In accordance with the invention, driver application 240 is executed by host processor 250 which, as shown, is also responsible for executing (at least in part) one or more user applications or processes 255. It is significant to note that track pad device 205 has no capability to process or analyze data signals (values) acquired from sensor 220. In accordance with the invention, sensor data is analyzed by a host computer system's general-purpose processor or central processing unit ("CPU").

The architecture of FIG. 2 recognizes and takes unique advantage of the processing power of modern CPUs incorporated in host computer systems (e.g., notebook or other personal computers, workstations and servers). This recognition and the architecture of FIG. 2 permits a computer system 200 that is both lower in cost to manufacture and more flexible than the systems provided by the prior art. Lower costs may be realized by eliminating the prior art's dedicated hardware for processing track pad sensor data (i.e., a processor and associated firmware memory—see components 130 and 135 in FIG. 1). Increased flexibility may be realized by providing feature set functionality via software that executes on the host computer's CPU—that is, processing/analyzing measured track pad sensor data on one or more of the host computer's CPUs. In this architecture, track pad functionality may be modified, updated and enhanced through conventional software upgrade procedures.

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Figure 3:
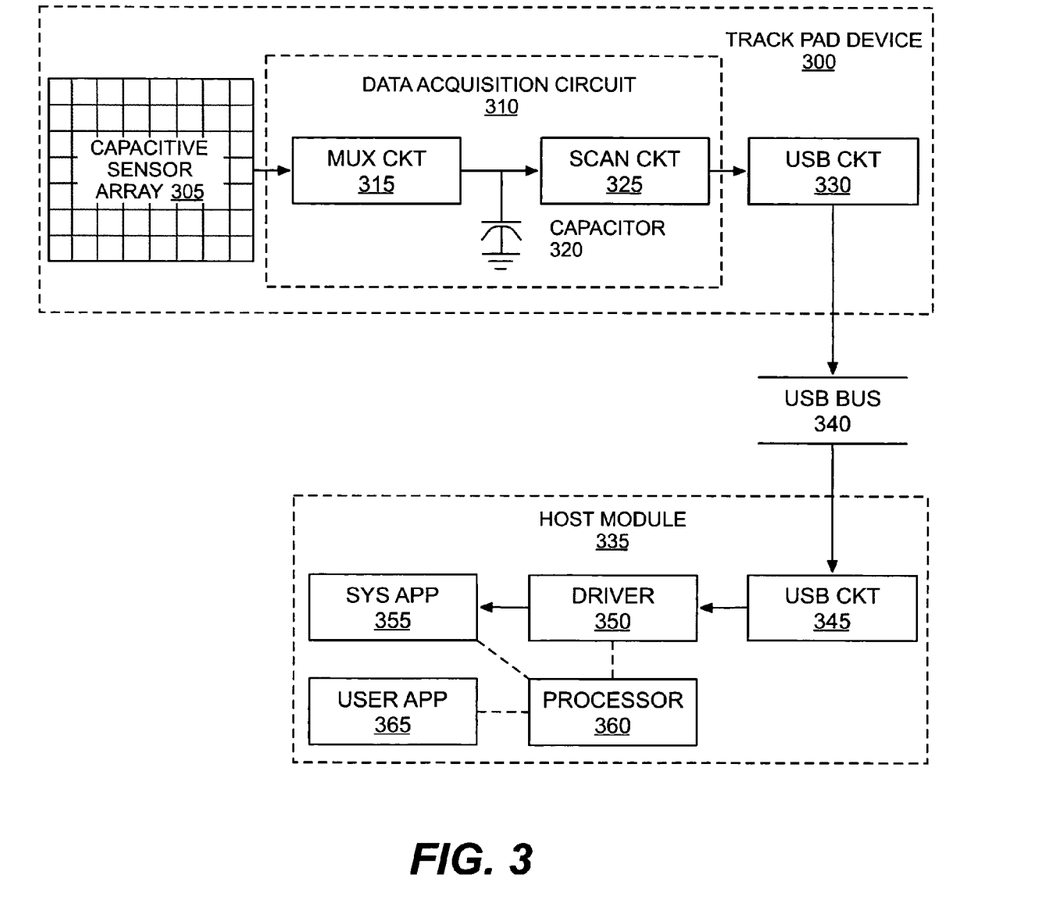
FIG. 3 shows, in block diagram form, a track pad device and host computer system in accordance with one embodiment of the invention.

Referring to FIG. 3, track pad device 300 in accordance with one embodiment of the invention comprises m-row by n-column capacitive sensor array 305, data acquisition circuit 310 (itself comprising multiplexer ("MUX") circuit 315, storage capacitor 320 and scan circuit 325) and Universal Serial Bus ("USB") transmit circuit 330. During operation, MUX circuit 315 is responsible for coupling and stimulating successive sensor array elements (e.g., rows, columns, or individual pixels—that is, an element at the intersection of a row and column) to storage capacitor 320 in a controlled/sequenced manner and indicating that a measurement cycle has begun to scan circuit 325. When the charge on storage capacitor 320 reaches a specified value or threshold, scan circuit 325 records the time required to charge storage capacitor 320 to the specified threshold. Accordingly, scan circuit 325 provides a digital value that is a direct indication of the selected sensor array element's capacitance. USB transmit circuit 330 is responsible for aggregating the measured capacitance values into packets and transmitting them in accordance with the USB protocol to host module 335 via USB bus 340. One of ordinary skill in the art will understand that depending upon the version of USB-used and the bandwidth of bus 340, USB transmit circuit 330 may transfer each frame of data to host module 335 in more than one, one or more than one packet. When the host module's USB receive circuit 345 receives the measured sensor data from track pad device 300 via USB bus 340, it unpacks and passes the measured capacitance data to driver application 350. Driver application 350, in turn, accepts and processes the raw (measured) capacitance data to provide meaningful cursor movement input to operating system application 355. (One of ordinary skill in the art will recognize that scan circuit 325 measures capacitance values from sensor array 305 in a predetermined order or sequence and that this sequence must be known by driver application 350 a priori or conveyed to driver application 350 along with the measured sensor data.) In one embodiment, driver application 350 implements track pad algorithms traditionally provided by a dedicated track pad processor such as, for example, processor 130 and firmware memory 135 of FIG. 1.

Figure 4:
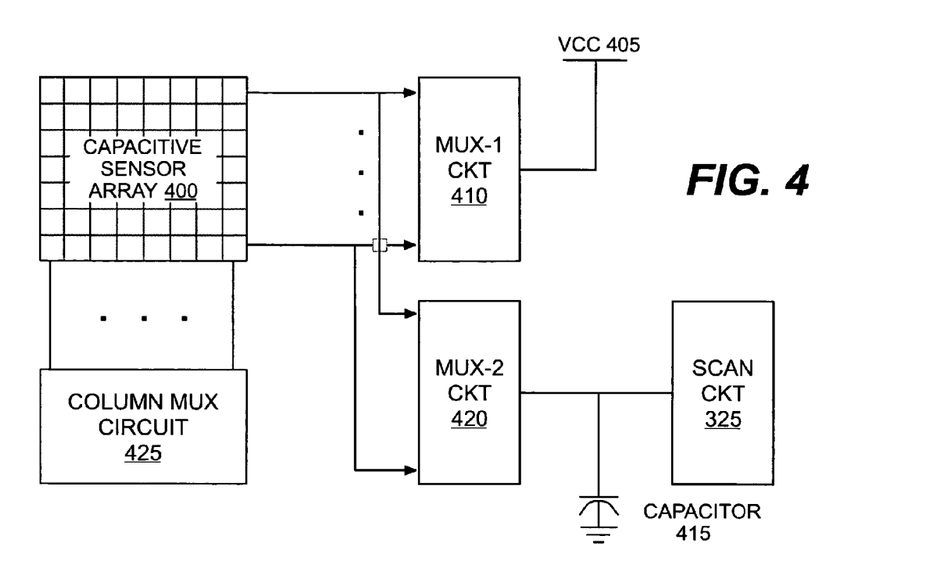
FIG. 4 shows, in block diagram form, a track pad sensor data acquisition system in accordance with one embodiment of the invention.

Referring to FIG. 4, a more detailed view of MUX circuit 315 as it can be implemented for a row and column addressable capacitive sensor array is illustrated. As shown, each row in sensor array 400 is electrically coupled to voltage source Vcc 405 through MUX-1 410 and to storage capacitor 415 through MUX-2 420. (While not shown in detail, each column of sensor array 400 is similarly coupled to Vcc 405 and to storage capacitor 415 through other MUX circuits—block 425.)

Figure 5:
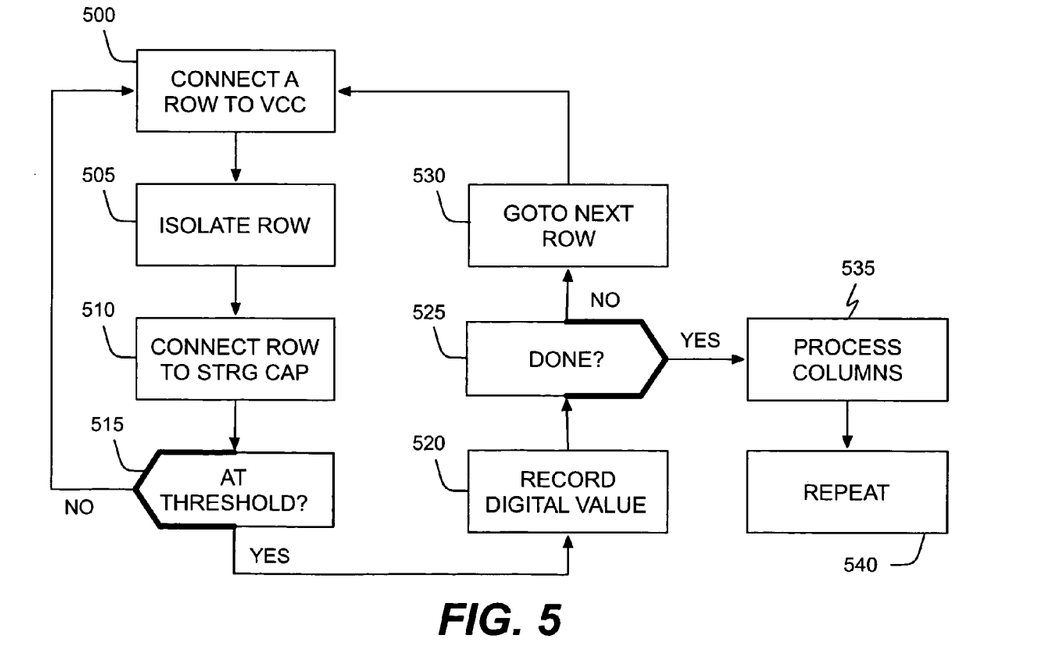
FIG. 5 shows, in flowchart form, a data acquisition method in accordance with one embodiment of the invention.

Referring now to FIG. 5, in operation MUX-1 410 couples a first sensor array row to Vcc 405 for a specified period of time (block 500) and then isolates or disconnects that row from Vcc 405 (block 505). Next, MUX-2 420 couples the same row to storage capacitor 415 for a specified period of time, or until the voltage on storage capacitor 415 reaches a specified threshold (block 510). If, during the time MUX-2 420 couples the selected sensor row to storage capacitor 415 the storage capacitor's voltage reaches a specified threshold (the "Yes" prong of block 515), the digital value corresponding to the time it took to charge storage capacitor 415 to the threshold is recorded by scan circuit 325 (block 520). If, during the time MUX-2 420 couples the selected sensor row to storage capacitor 415 the storage capacitor's voltage does not reach the specified threshold (the "No" prong of block 515), the acts of block 500-510 are repeated. Once a digital value corresponding to the capacitance of the selected row has been obtained (block 520), a check is made to see if there are additional rows in sensor array 400 that need to be sampled. If all the rows in sensor array 400 have been sampled in accordance with blocks 500-520 (the "Yes" prong of block 525), the same process is used to acquire a capacitance value for each column of sensor elements in sensor array 400 (block 535). Once all rows and all columns have been processed in accordance with blocks 500-535, the entire process is repeated (block 540). If, on the other hand, there are rows in sensor array 400 that have not been sampled in accordance with blocks 500-520 (the "No" prong of block 525), the next row is selected (block 530) and the acts of blocks 500-525 are performed.

In one illustrative embodiment: sensor array 400 comprises a 16×32 capacitive grid, providing 48 output channels; Vcc is 3.3 volts; storage capacitor 415 is approximately 10,000 picofarads, an average row capacitance value is approximately 12 picofarads; an average column capacitance value is approximately 9 picofarads; the average change in capacitance of a row or column electrode due to a user's finger touching sensor array 400 is approximately 0.2 picofarads; the threshold value at which a digital capacitance value is obtained is 1.6 volts; and the rate at which MUX circuits 410, 420 and 425 are switched is 6 megahertz. It has been found, for these values, that its takes approximately 580-600 sample cycles to charge storage capacitor 415 to the threshold voltage. In one embodiment, the digital capacitance value is, in fact, a count of the number of sampling cycles required to charge storage capacitor 415 to the threshold value. One of ordinary skill in the art will recognize that this value is directly related to the sensor element's (e.g., row or column) capacitance value. In this embodiment, scan circuit 325 (in conjunction with MUX circuits 410, 420 and 425 and storage capacitor 415) measures each of the 48 sensor array outputs 125 times each second, with each measurement comprising a 10-bit value (unsigned integer). Referring to the 48 measurements acquired by scan circuit 325 from sensor array 400 in each of the 125 epochs as a frame, the illustrative track pad sensor device generates:

$$\left(\frac{48 \text{ channels}}{\text{frame}}\right)\left(\frac{10 \text{ bits}}{\text{channel}}\right)\left(\frac{125 \text{ frames}}{\text{second}}\right)\left(\frac{1 \text{ byte}}{8 \text{ bits}}\right) = 7,500 \text{ bytes/second.}$$

As noted with respect to FIG. 2 and as further shown in FIG. 3, driver application 350 is executed general purpose processing unit 360 that is also responsible for executing user applications and tasks, e.g., 365. That is, in accordance with the invention raw track pad sensor data is analyzed by one, or more, general-purpose processing units associated with the host computer system and not by a dedicated processor or processing circuit(s) associated with track pad device 300. A direct consequence of the architecture of FIGS. 2 and 3 is that the processing resources (e.g., CPUs) tasked with analyzing track pad sensor data must be shared with other computer system processing needs such as other system level and user level applications.

Various changes in the materials, components, and circuit elements of the described embodiments are possible without departing from the scope of the following claims. Consider, for example, the system of FIG. 3. Other embodiments could include a smaller (e.g., 10×16) or larger (e.g., 32×32) sensor array 305. Further, frame rates other than 125 Hertz ("Hz") and sample resolutions other than 10 bits are possible. It will also be understood that the host computer system may comprise more than one general-purpose processing unit (e.g., processor 250). In addition, some of the circuitry identified in FIGS. 2 and 3 as being integral to track pad device 205 or 300 may be embodied in circuitry also used for other functions. For example, transmit circuits 230 and 330 may be shared by other USB input devices such as, for example, a keyboard. In addition, one of ordinary skill in the art will recognize that the invention is also applicable to track pad sensor devices that are pixilated rather that row-column addressable. It will be further recognized that the operational procedure outlined in FIG. 5 may be modified. For instance, sensor column values may be obtained before sensor row values. Alternatively, sensor row and sensor column data may be interlaced and/or measured at the same time. In any event, it will be recognized that scan circuit 325 measures sensor pad characteristic values (e.g., capacitance or resistance) in a set order and that this order must be known or communicated to driver application 350. In yet another embodiment, scan circuit 325 may measure sensor characteristic values in any convenient manner and reorder them into a sequence known or expected by driver application 350 prior to transmission by transmit circuit 330.

Various gestures can be detected by the track pad device 300 and interpreted as user-level tasks or operations. For example, the user gesture made on the sensing elements 305 of the track pad device 300 include a touch of one digit, a touch of two or more digits concurrently, a touch with sliding movement of one or more digits, a touch and sliding movement of one or more digits concurrently with a stationary touch of one or more digits, a touch and contractive movement of two or more digits, a tap of one or more digits, a touch and expansive movement of two or more digits, a touch of one or more digits with a tap of one or more digits, a touch of a portion (e.g., palm) of a hand, and a touch and movement of a portion of a hand. Moreover, the digits or portions of one or two hands can also be used for gestures made on the track pad device.

Some one-finger gestures include a one-finger tap on the track pad device to implement a left click mouse operation and a one-finger down and hold on the track pad device to implement a cursor motion. Some two-finger gestures on the track pad device include: (1) two fingers down together and a vertical movement to implement a vertical scroll operation; (2) two fingers down together and a horizontal movement to implement a horizontal scroll operation; (3) a two-finger tap to implement an operation; (4) two fingers both down and then spread apart and back together to implement a zoom operation; (5) two fingers down together and rotated in a circular motion either clockwise/counter-clockwise to implement a rotate operation; (6) one finger down and then a second finger down to implement an operation; (7) one finger down and then a second finger tap to implement an operation; and (8) two fingers down together and a diagonal movement to implement an operation.

Some three-finger and four-finger gestures on the track pad device to implement user-level tasks or operations are shown in the Table below.

| Three-Finger Gestures | Four-Finger Gestures |
| --- | --- |
| three-finger tap | four-finger tap |
| three fingers down together and sweep away or towards from self | four fingers down together and sweep away from or towards self on the track pad |
| three fingers down together and sweep sideways towards left or right | four fingers down together and sweep towards left or right on the track pad |
| three fingers down together and a vertical, a horizontal, or a diagonal movement | four fingers down together and a vertical, a horizontal, or a diagonal movement |
| three fingers down together and rotate in circular motion either clockwise/counter-clockwise | four fingers down together and rotate in a circular motion either clockwise/counter-clockwise |
| two fingers down and then third finger down or tap | three fingers down and then a fourth finger down or tap |
| one finger down and then two fingers down or tap | two fingers down and then two fingers down or tap |
| | one finger down and then three fingers down or tap |

In FIGS. 6 through 9, a number of exemplary gestures 600, 700, 800, and 900 and corresponding user-level tasks or operations are shown and described below. These gestures 600, 700, 800, and 900 and the corresponding user-level tasks are exemplary. One skilled in the art will appreciate that other gestures and user-level tasks are possible beyond those expressly described herein.

Figures 6, 7:
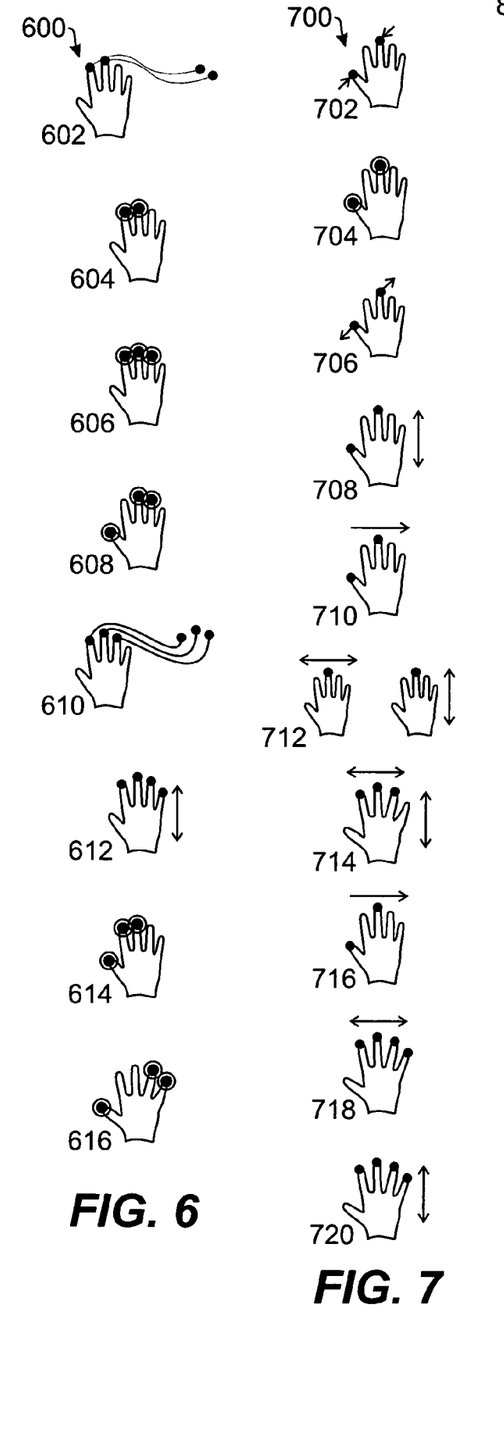
FIGS. 6 through 9 show various gestures that can be made on a touch pad and interpreted as a user-level task using the disclosed system according to the present disclosure.

Referring to FIG. 6, user gestures 600 on the sensing elements of a track pad device (not shown) can be used to perform various mouse operations or tasks of a host application. The mouse operations can include, but are not limited to, a point, a click, a double click, a right click, a drag/select, and a scroll. For example, a point operation can be implemented with a first gesture 602 involving touching and moving any two adjacent fingers on the track pad device. A click operation can be implemented with a second gesture 604 involving a tap (momentary touch) of any two adjacent fingers on the track pad device. A double click operation can be implemented with a third gesture 606 involving a tap (momentary touch) of any three adjacent fingers on the track pad device. A right click operation can be implemented with a fourth gesture 608 involving a tap of the thumb, middle finger, and ring finger on the track pad device. A drag/select operation can be implemented with a fifth gesture 610 involving a touch and movement of three fingers on the track pad device. A scroll operation can be implemented with a sixth gesture 612 involving the touch and slide up/down of four fingers on the track pad device.

The system can also be used to emulate operation of a three-button mouse. For example, a click of a middle button can be implemented by a seventh gesture 614 involving a tap of the thumb, index, and middle fingertips on the track pad device. In addition, a right click in a three-button emulation can be implemented by a eighth gesture 616 involving the spreading of the hand and then the tap of the thumb, ring, and pinky fingers on the track pad device.

Referring to FIG. 7, additional user gestures 700 on the track pad device can be used to implement various editing and cursor operations or tasks of a host application. The editing operations can include, but are not limited to, cut, copy, paste, undo previous operation, and redo previous operation. The cursor operations can include, but are not limited to, move cursor, select with cursor, tab cursor, move cursor to home, move cursor to end, page up, and page down.

For example, a cut operation can be implemented with a first gesture 702 involving a touch and pinch of the thumb and middle finger on the track pad device. A copy operation can be implemented with a second gesture 704 involving a tap of the thumb and middle finger on the track pad device. A paste operation can be implemented with a third gesture 706 involving a touch and expansion of the thumb and middle finger on the track pad device. An Undo/Redo operation can be implemented with a fourth gesture 708 involving a touch and slide of the thumb and middle finger up/down on the track pad device. Undoing just one operational step can be implemented by sliding quickly, or multiple steps can be implemented by sliding gradually. A Tab/BackTab operation can be implemented with a fifth gesture 710 involving a touch and slide of the thumb and middle finger right/left on the track pad device. Just one tab can be implemented by sliding-quickly, and repetitive tabs can be implemented by sliding gradually.

An arrows operation can be implemented with a sixth gesture 712 involving a touch with a slide of any finger on the track pad device to move the text cursor. A Text Select operation can be implemented with a seventh gesture 714 involving a touch with a slide up/down of three spread fingers on the track pad device. A Tab/Back Tab operation can be implemented with a eighth gesture 716 involving a touch of the thumb and middle finger and a slide left/right on the track pad device. A Home/End operation can be implemented with a ninth gesture 718 involving a touch of four spread fingers with slide left/right on the track pad device. Finally, a Page-Up/Page-Down operation can be implemented with a tenth gesture 720 involving a touch of four spread fingers with a slide up/down on the track pad device.

Figure 8:
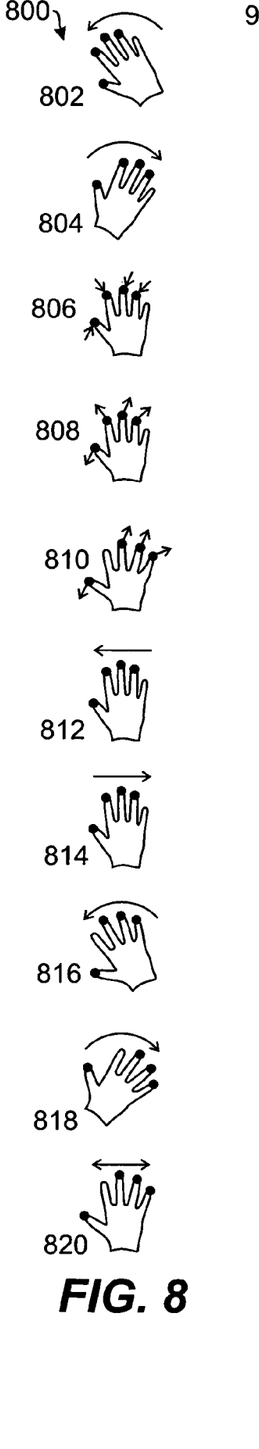

Referring to FIG. 8, additional user gestures 800 on the sensing elements of the track pad can be used to implement various file and application operations or tasks of a host application. The file operations can include, but are not limited to, open file, close file, save file, new file, print file, next file, and previous file. The application operations can include, but are not limited to, show desktop, exit application, and switch application window.

For example, an open file operation can be implemented with a first gesture 802 involving a touch with counter-clockwise rotation of the thumb and three fingers on the track pad device. A close file operation can be implemented with a second gesture 804 involving a touch with clockwise rotation of the thumb and three fingers on the track pad device. A save file operation can be implemented with a third gesture 806 involving a touch with contraction of the thumb and three fingers on the track pad device. A new file operation can be implemented with a fourth gesture 808 involving a touch with expansion of the thumb and three inner fingers on the track pad device. A print file operation can be implemented with a fifth gesture 810 involving pre-spreading of the hand and then a touch with further expansion of the thumb and three outer fingers on the track pad device. A next file operation can be implemented with a sixth gesture 812 involving a touch with a slide of the thumb and three fingertips to the left on the track pad device. A previous file operation can be implemented with a seventh gesture 814 involving a touch with a slide of the thumb and three fingertips to the right on the track pad device.

An operation for showing the desktop can be implemented with a eighth gesture 816 involving touching the track pad with spread thumb and three fingers and then sliding to the left on the track pad device. An exit application operation can be implemented with a ninth gesture 818 involving a touch with clockwise rotation of spread thumb and three fingers on the track pad device. A switch application operation can be implemented with a tenth gesture 820 involving touching the track pad with spread three fingers and thumb and then sliding left or right on the track pad device. Sliding crisply can be used to advance just one window, and sliding gradually can be used to scroll through whole list.

Figure 9:
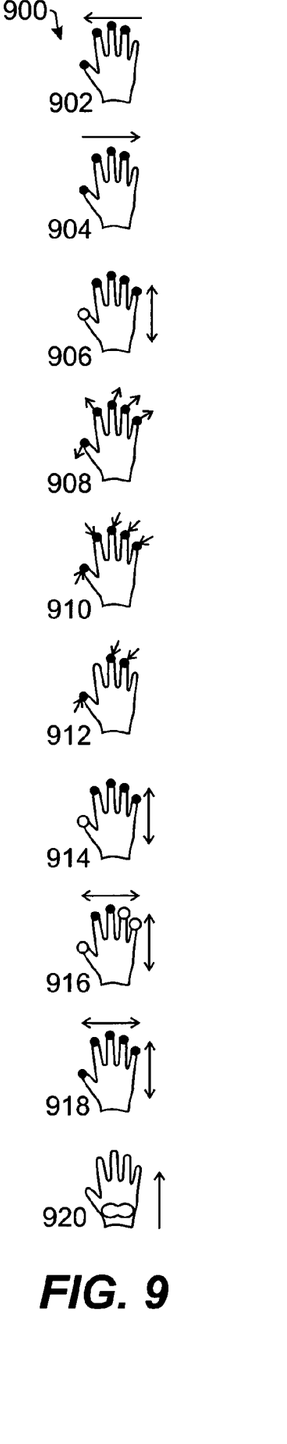

Referring to FIG. 9, additional user gestures 900 on the track pad device can be used to perform various web-browsing and keyboard operations or tasks of a host application. The browser operations can include, but are not limited to, back, forward, scroll, zoom in, zoom out, and find in page. The keyboard operations can include, but are not limited to, shift, control/command, and select key.

For example, a back operation can be implemented with a first gesture 902 involving a touch with a slide of the thumb and three fingertips to the left on the track pad device. A forward operation can be implemented with a second gesture 904 involving a touch with a slide of the thumb and three fingertips to the right on the track pad device. A scroll operation can be implemented with a third gesture 906 involving a touch with a slide of four fingers up/down on the track pad device. If desired, the thumb can be rested on the track pad device after starting the slide on the track pad device. A zoom-in operation can be implemented with a fourth gesture 908 involving a touch with expansion of the thumb and four fingers on the track pad device. A zoom-out operation can be implemented with a fifth gesture 910 involving a touch with a contraction of the thumb and four fingers on the track pad device. A find-in-page operation can be implemented with a sixth gesture 912 involving a touch with a pinch of the thumb and two fingertips on the track pad device. A fine scroll operation can be implemented with a seventh gesture 914 involving the "roll" of fingers instead of sliding them on the track pad device. If desired, the thumb can be rested on the track pad device once the scroll starts. A pointing operation can be implemented with an eighth gesture 916 involving dropping other fingers to point with all five fingers on the track pad device once pointing starts. Additional gestures can include a ninth gesture 918 involving moving all five fingers on the track pad device and a tenth gesture 920 involving a touch and movement of a portion (e.g., palm) of a hand on the track pad device.

Figure 10:
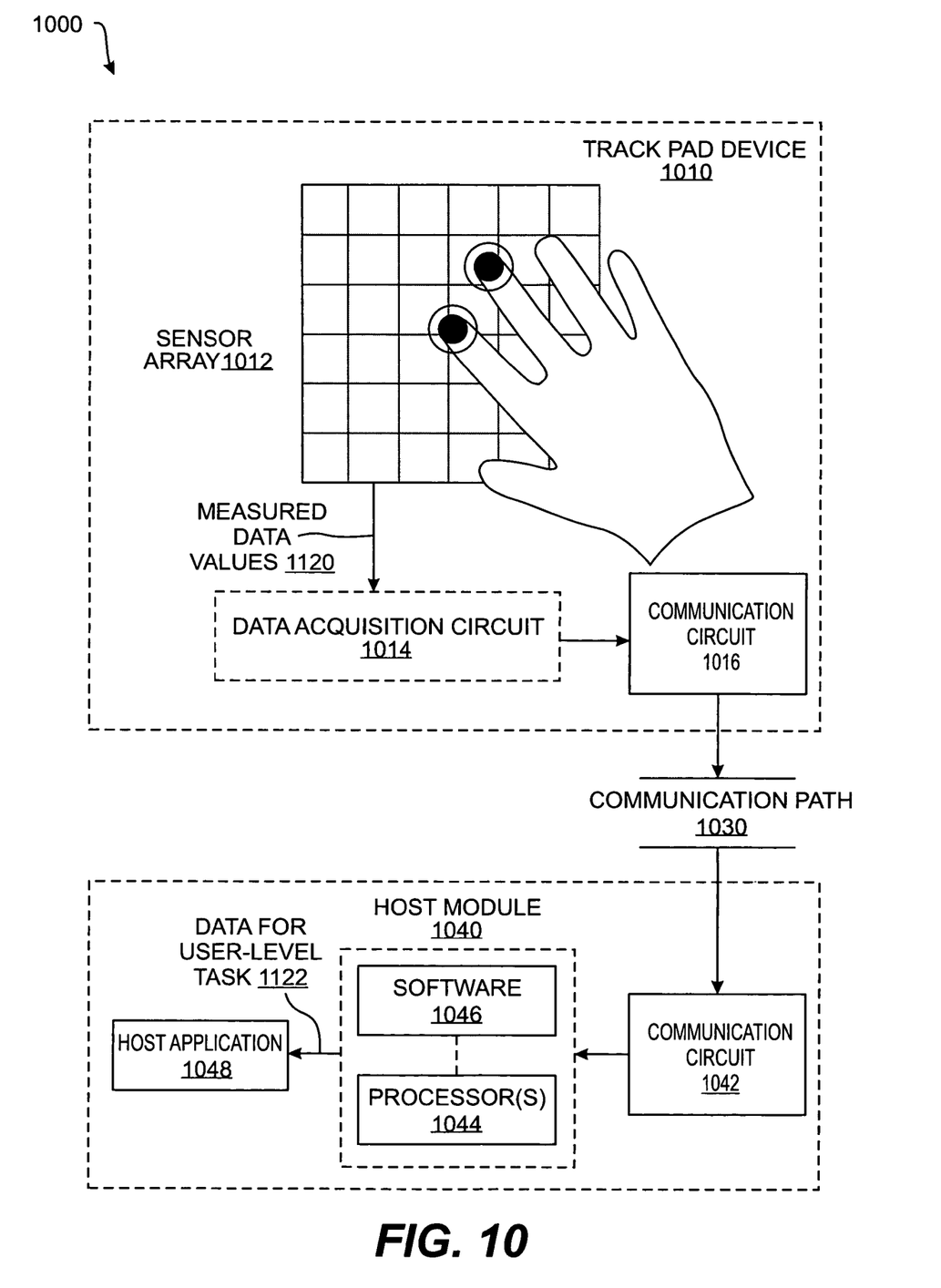
FIG. 10 illustrates the disclosed touch pad device and a host module for interpreting measured data values from gestures as user-level tasks for a host application.

Referring to FIG. 10, a computer system 1000 according to certain teachings of the present disclosure is illustrated. The system 1000 includes track pad device 1010 having sensor array 1012, data acquisition circuit 1014, first communication circuit 1016, host module 1040 having second communication circuit 1042, one or more host processors 1044, software 1046, and host application 1048, each of which is similar to previous embodiments discussed above. For example, the second communication circuit 1042 is operatively coupled to the first communication circuit 1016 via communication path 1030, such as a USB bus. The one or more host processors 1044 are operatively coupled to the second communication circuit 1042, and at least one of the host processors 1044 is responsible, at least in part, for executing user-level tasks of the host application 1048.

Sensing elements of the track pad array 1012 measure data values 1120 (e.g., raw data) in response to a user performing a user gesture (e.g., the two-finger gesture shown) on the array 1012. The touch pad device 1010 does not process the raw, measured data values representative of the user gesture. Instead, the data acquisition circuit 1014 obtains the measured data values 1020 of the array 1012, and the first communication circuit 1016 transmits the measured data values 1020 to the second communication circuit 1042 of the host module 1040. The gesture processing software 1046 on the host module 1040 executes on at least one of the host processors 1044. Upon receiving the raw data values-1020, the gesture processing software 1046 interprets the raw data values 1020 communicated from the track pad device 1010 and makes interpreted data 1122 available to the host application 1048 for execution as a user-level task.

To interpret the raw data values 1020, the software 1046 uses algorithms for processing the data and interpreting it into data for user-level tasks or operations to be implemented at the host module 1040. The algorithms used can include those algorithms known in the art, such as existing algorithms used with touch-screens, existing algorithms used with touch pads that process gestures at the touch pad, and existing algorithms used for navigation features provided on a prior art Fountain touch pad. For example, the software 1046 can use algorithms, such as those disclosed in U.S. Pat. Nos. 6,570,577 and 6,677,932 and in U.S. Patent Publication Nos. 2005/0104867 and 2002/0015024, which are incorporated herein by reference.

Briefly, an exemplary algorithm for the system 1000 may first involve the track pad device 1010 obtaining raw row and column data from the sensor array 1012 at a first point in time and transmitting that raw data to the host module 1040. The software 1046 receives that row and column data as a current frame. The software 1046 then filters or smoothes the data and separately counts the number of areas that have created increased signal in the rows and columns of the current frame. These areas of increased signal correspond to images of the user's digits on the track pad device 1010. (The areas of increased strength are referred to here as the finger count). If the finger count in either the rows or columns of the current frame is zero, then the finger count for the entire track pad device 1010 of the current frame is assumed to be zero. Otherwise, the finger count for the entire track pad device 1010 is set to the maximum of the row finger count or the column finger count. Once the maximum finger count of the current frame has been established, it is compared to the maximum finger count in one or more previous frames of data obtained from the track pad device 1010. If the maximum finger count has changed between the current and previous frames, the state of this change is examined to determine if the change in finger count represents a gesture or is part of a gesture.

When examining the state between the current and previous finger counts, the amount of time that the previous finger count was held may be considered. In one example, the maximum finger count in the current frame may be one, while the maximum finger count in the previous frame may have been two. If the two-finger count in the previous frame lasted less than 250-ms, then the user has made a second finger tap on the track pad device 1010 corresponding to a gesture for a mouse button operation, for example. On the other hand, if the two-finger count in the previous frame lasted more than 250-ms, then the user has used a two-finger gesture for performing a scroll operation, for example, and no mouse button operation is issued.

When examining the state between the current and previous finger counts, the locations of the areas of increased signal strength (i.e., the rows and columns of the user's digits on the track pad device 1010) may be considered. In one example, the maximum finger counts in the current and previous frames may both be two. If the two-finger count in the previous frame had first row and column values that are different than second row and column values in the current frame, then the user has moved two fingers on the track pad device 1010, which may correspond to a gesture for a scroll operation or the like.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A computer system, comprising:
    a track pad device including a plurality of conductive lines distributed substantially throughout a touch-sensing area, each conductive line having a capacitance that is one of a capacitive coupling capacitance between the conductive line and one or more other conductive lines and a self-capacitance of the conductive line, wherein an object touching, or in close proximity to, the touch-sensing area changes the capacitance of a conductive line, a data acquisition system that acquires a digital value that is a direct indication of the capacitance of each of a plurality of the conductive lines, and a first communication circuit that transmits the digital values aggregated into packets according to a universal serial bus protocol; and
    a host module including a second communication circuit that receives the digital values, the second communication circuit being operatively coupled to the first communication circuit via a communication path, one or more host processors operatively coupled to the second communication circuit, at least one of the host processors being responsible, at least in part, for executing user-level tasks of a host application, and software executing on at least one of the host processors, the software interpreting the digital values from the track pad device, including calculating movement information of the object touching, or in close proximity to, the touch-sensing area, and making the interpreted data available to the host application for execution as a user-level task.

2. The computer system of claim 1, wherein the user gesture includes one of a touch of one digit, a touch of two or more digits concurrently, a touch and sliding movement of one or more digits, a touch and sliding movement of one or more digits concurrently with a stationary touch of one or more digits, a touch and contractive movement of two or more digits, a tap of one or more digits, a touch and expansive movement of two or more digits, a touch of one or more digits with a tap of one or more digits, a touch of a portion of a hand, and a touch and movement of a portion of a hand.

3. The computer system of claim 1, wherein the user-level task of the host application includes one of a mouse operation, an editing operation, a cursor operation, a file operation, an application operation, a browser operation, and a keyboard operation.

4. The computer system of claim 3, wherein the mouse operation includes one of a point, a click, a double click, a right click, a drag/select, and a scroll.

5. The computer system of claim 3, wherein the editing operation includes one of cut, copy, paste, undo previous operation, and redo previous operation.

6. The computer system of claim 3, wherein the cursor operation includes one of move cursor, select with cursor, tab cursor, move cursor to home, move cursor to end, page up, and page down.

7. The computer system of claim 3, wherein the file operation includes one of open file, close file, save file, new file, print file, next file, and previous file.

8. The computer system of claim 3, wherein the application operation includes one of show desktop, exit application, and switch application window.

9. The computer system of claim 3, wherein the browser operation includes one of back, forward, scroll, zoom in, zoom out, and find in page.

10. The computer system of claim 3, wherein the keyboard operation includes one of shift, control/command, and select key.

11. The computer system of claim 1, wherein a plurality of packets are transmitted in a single frame under the universal serial bus protocol.

12. The computer system of claim 1, wherein the data acquisition system includes a multiplexer circuit that electrically couples successive conductive lines to a storage capacitor.

13. A host module operatively coupled to a track pad device, the track pad device including a plurality of conductive lines distributed substantially throughout a touch-sensing area, each conductive line having a capacitance that is one of a capacitive coupling capacitance between the conductive line and one or more other conductive lines and a self-capacitance of the conductive line, wherein an object touching, or in close proximity to, the touch-sensing area changes the capacitance of a conductive line, a data acquisition system that acquires a digital value that is a direct indication of the capacitance of each of a plurality of the conductive lines, and a first communication circuit that transmits the digital values aggregated into packets according to a universal serial bus protocol, the host module comprising:

a second communication circuit that receives the digital values, the second communication circuit operatively coupling to the first communication circuit via a communication path;

one or more host processors operatively coupled to the second communication circuit, at least one of the host processors being responsible, at least in part, for executing user-level tasks of a host application; and software executing on at least one of the host processors, the software interpreting the digital values from the track pad device, including calculating movement information of the object touching, or in close proximity to, the touch-sensing area, and making the interpreted data available to the host application for execution as a user-level task.

14. The host module of claim 13, wherein the user gesture includes one of a touch of one digit, a touch of two or more digits concurrently, a touch with sliding movement of one or more digits, a touch and sliding movement of one or more digits concurrently with a stationary touch of one or more digits, a touch and contractive movement of two or more digits, a tap of one or more digits, a touch and expansive movement of two or more digits, a touch of one or more digits with a tap of one or more digits, a touch of a portion of a hand, and a touch and movement of a portion of a hand.

15. The host module of claim 13, wherein the user-level task includes one of a mouse operation, an editing operation, a cursor operation, a file operation, an application operation, a browser operation, and a keyboard operation.

16. The host module of claim 15, wherein the mouse operation includes one of a point, a click, a double click, a right click, a drag/select, and a scroll.

17. The host module of claim 15, wherein the editing operation includes one of cut, copy, paste, undo previous operation, and redo previous operation.

18. The host module of claim 15, wherein the cursor operation includes one of move cursor, select with cursor, tab cursor, move cursor to home, move cursor to end, page up, and page down.

19. The host module of claim 15, wherein the file operation includes one of open file, close file, save file, new file, print file, next file, and previous file.

20. The host module of claim 15, wherein the application operation includes one of show desktop, exit application, and switch application window.

21. The host module of claim 15, wherein the browser operation includes one of back, forward, scroll, zoom in, zoom out, and find in page.

22. The host module of claim 15, wherein the keyboard operation includes one of shift, control/command, and select key.

23. The host module of claim 13, wherein a plurality of packets are transmitted in a single frame under the universal serial bus protocol.

24. The host module of claim 13, wherein the software comprises a driver application determining a computer command from the digital values, including smoothing the digital values of a current frame and separately counting a number of areas that have an increased capacitance corresponding to an object touching, or in close proximity to, the touch-sensing area, determining a maximum object count of the current frame, and comparing the maximum object count of the current frame to a maximum object count in one or more previous frames, and making the computer command available to the host application for execution as the user-level task.

25. A method comprising:
acquiring digital values that are direct indications of capacitances of a plurality of conductive lines distributed substantially throughout a touch-sensing area of a track pad device, each capacitance being one of a capacitive coupling capacitance between one of the conductive lines and one or more other conductive lines and a self-capacitance of one of the conductive lines, wherein an object touching, or in close proximity to, the touch-sensing area changes the capacitance of a conductive line;
transmitting the digital values aggregated into packets according to a universal serial bus protocol to one or more host processors of a host module, at least one of the host processors being responsible, at least in part, for executing user-level tasks of a host application;
interpreting the digital values with software executing on at least one of the host processors, including calculating movement information of the object touching, or in close proximity to, the touch-sensing area; and
making the interpreted data available to the host application for execution as a user-level task by the host application.

26. The method of claim 25, wherein the user gesture includes one of a touch of one digit, a touch of two or more digits concurrently, a touch with sliding movement of one or more digits, a touch and sliding movement of one or more digits concurrently with a stationary touch of one or more digits, a touch and contractive movement of two or more digits, a tap of one or more digits, a touch and expansive movement of two or more digits, a touch of one or more digits with a tap of one or more digits, a touch of a portion of a hand, and a touch and movement of a portion of a hand.

27. The method of claim 25, wherein the user-level task includes one of:
a mouse operation, an editing operation, a cursor operation, a file operation, an application operation, a browser operation, and a keyboard operation.

28. The method of claim 25, wherein the act of acquiring the digital values comprises multiplexing the conductive lines by electrically coupling successive conductive lines to a storage capacitor, wherein one of the digital values is acquired during each coupling.

29. The method of claim 25, wherein a plurality of packets are transmitted in a single frame under the universal serial bus protocol.

30. The computer system of claim 1, wherein the conductive lines comprise at least one of (i) rows of a capacitive sensor array and (ii) columns of a capacitive sensor array.

31. The computer system of claim 1, wherein the conductive lines comprise pixels of a capacitive sensor array.

32. The host module of claim 13, wherein the conductive lines comprise at least one of (i) rows of a capacitive sensor array and (ii) columns of a capacitive sensor array.

33. The host module of claim 13, wherein the conductive lines comprise pixels of a capacitive sensor array.

34. The method of claim 25, wherein the conductive lines comprise at least one of (i) rows of capacitive sensor array and (ii) columns of a capacitive sensor array.

35. The method of claim 25, wherein the conductive lines comprise pixels of a capacitive sensor array.

* * * * *

UNITED STATES PATENT AND TRADEMARK OFFICE
CERTIFICATE OF CORRECTION

| | | |
|---|---|---|
| PATENT NO. | : 7,728,823 B2 | Page 1 of 1 |
| APPLICATION NO. | : 11/232299 | |
| DATED | : June 1, 2010 | |
| INVENTOR(S) | : Benjamin Lyon et al. | |

It is certified that error appears in the above-identified patent and that said Letters Patent is hereby corrected as shown below:

In column 14, line 28, in Claim 34, delete "of capacitive" and insert -- of a capacitive --, therefor.

Signed and Sealed this

Eighth Day of November, 2011

David J. Kappos
*Director of the United States Patent and Trademark Office*